(12) United States Patent
Quinlan et al.

(10) Patent No.: US 9,489,422 B2
(45) Date of Patent: Nov. 8, 2016

(54) SYSTEM AND METHOD FOR SEARCHING DISPARATE DATASTORES VIA A REMOTE DEVICE

(75) Inventors: Sean M. Quinlan, Duvall, WA (US); Bob Standen, Leamington Spa (GB); Haniff Somani, Mercer Island, WA (US)

(73) Assignee: Good Technology Corporation, Sunnyvale, CA (US)

( * ) Notice: Subject to any disclaimer, the term of this patent is extended or adjusted under 35 U.S.C. 154(b) by 1387 days.

(21) Appl. No.: 12/294,708

(22) PCT Filed: Apr. 2, 2007

(86) PCT No.: PCT/US2007/065772
§ 371 (c)(1),
(2), (4) Date: May 17, 2010

(87) PCT Pub. No.: WO2007/115254
PCT Pub. Date: Oct. 11, 2007

(65) Prior Publication Data
US 2011/0113062 A1    May 12, 2011

Related U.S. Application Data

(60) Provisional application No. 60/788,006, filed on Mar. 31, 2006.

(51) Int. Cl.
*G06F 17/30*    (2006.01)

(52) U.S. Cl.
CPC ... *G06F 17/30427* (2013.01); *G06F 17/30864* (2013.01)

(58) Field of Classification Search
USPC ................................................ 707/770, 766
See application file for complete search history.

(56) References Cited

U.S. PATENT DOCUMENTS

| | | | |
|---|---|---|---|
| 6,704,726 B1 * | 3/2004 | Amouroux | |
| 6,779,177 B1 * | 8/2004 | Bahrs et al. | 717/173 |
| 6,901,428 B1 * | 5/2005 | Frazier | G06F 17/30905 707/999.009 |
| 7,092,703 B1 * | 8/2006 | Papineau | 455/418 |
| 7,801,896 B2 * | 9/2010 | Szabo | 707/739 |

(Continued)

FOREIGN PATENT DOCUMENTS

EP    1 304 616 A1    4/2003

OTHER PUBLICATIONS

Extended European Search Report dated Jul. 9, 2012 in European Patent Application No. 12160229.6-1225 filed Apr. 2, 2007.

(Continued)

*Primary Examiner* — Hung T Vy
(74) *Attorney, Agent, or Firm* — Fish & Richardson P.C.

(57) ABSTRACT

A system and method are provided for searching the contents of a network system connected to data storage devices from a remote terminal over a wired or wireless link. This system formulates search requests, and dispatches the requests, A variety of search engines and services are invoked to find the requested contents. A summary is formed in a format brief enough for transmission over a wireless link. The search summary information is indexed the remote terminal to subsequently request all or part of a document referenced in the search summary, allows formation of requests of all or part of a referenced document in its original form or in a form transcoded appropriately for transmission over a wireless link and presented on the remote terminal.

20 Claims, 5 Drawing Sheets

(56) References Cited

U.S. PATENT DOCUMENTS

| | | | |
|---|---|---|---|
| 7,966,033 B2* | 6/2011 | Borran et al. | 455/522 |
| 8,073,700 B2* | 12/2011 | Jaramillo et al. | 704/270.1 |
| 8,527,874 B2* | 9/2013 | Friedman | 715/703 |
| 2001/0021929 A1 | 9/2001 | Lin et al. | |
| 2002/0049756 A1* | 4/2002 | Chua et al. | 707/4 |
| 2002/0073104 A1* | 6/2002 | Nunez | G06F 17/30321 |
| 2003/0037043 A1 | 2/2003 | Chang et al. | |
| 2004/0003132 A1* | 1/2004 | Stanley et al. | 709/316 |
| 2005/0165754 A1 | 7/2005 | Valliappan et al. | |
| 2006/0013487 A1* | 1/2006 | Longe et al. | 382/229 |
| 2007/0136390 A1* | 6/2007 | Blum et al. | 707/201 |
| 2007/0162428 A1* | 7/2007 | Williams et al. | 707/3 |
| 2007/0162942 A1* | 7/2007 | Hamynen et al. | 725/105 |
| 2011/0246575 A1* | 10/2011 | Murayama | G06F 17/30011 709/204 |

OTHER PUBLICATIONS

Multimodal browser from Wikipedia, the free encyclopedia, http://en.wikipedia.org/wiki/Multimodal_browser[Mar. 12, 2012 10:43:28], modified Dec. 23, 2009, 1 page.

Multimodal interaction from Wikipedia the free encyclopedia, http://en.wikipedia.org/wiki/Multimodal_interaction[Mar. 12, 2012 10:42:16], modified Oct. 12, 2012, 4 pages.

* cited by examiner

SYSTEM AND METHOD FOR SEARCHING DISPARATE DATASTORES VIA A REMOTE DEVICE

CROSS-REFERENCE TO RELATED APPLICATIONS

This application claims the benefit of the earlier filing date of U.S. Provisional Application No. 60/788,006 entitled "System and Method for Searching Disparate Data Stores Via a Remote Device" filed Mar. 31, 2006, the entirety of which is incorporated herein by reference.

BACKGROUND OF THE INVENTION

The present inventions relate to remote data access systems and more particularly to a uniform access of disparate network services via an intermediate interface of a wireless network.

Currently, remote devices such as personal digital assistants (PDAs) and smart phones are utilized to access an increasing number of services over wireless data links. As the World Wide Web and Internet were established to account for a multitude of data exchange protocols, formats, APIs and the like. As such, it is difficult to leverage remote devices in an Internet environment due to the complex overhead and messaging sequences necessary for retrieving services and/or information from the disparate data stores.

Presently, there is a need for a uniform access system and methodology which will enable the uniform access of disparate data stores via a remote device.

SUMMARY OF EXEMPLARY ASPECTS OF THE INVENTIONS

In one aspect of the claimed advancements, a system for searching application services from a remote device is provided. The system enables a negotiation in which search requests are reformatted in accordance with a native, uniform access protocol. A variety of search engines and/or services may be queried in accordance with their particular service and invocation format such that data from these disparate sources is provided to a remote device in a format which is transcoded appropriately for presentation thereto.

It is to be understood that both the foregoing general description of the inventions and the following detailed description are exemplary, but are not restrictive of the invention.

BRIEF DESCRIPTION OF THE SEVERAL VIEWS OF THE DRAWINGS

A more complete appreciation of the inventions and many of the attendant advantages thereof will be readily obtained as the same becomes better understood by reference to the following detailed description when considered in connection with the accompanying drawings. However, the accompanying drawings do not in any way limit the scope of the inventions embraced by the specification. The scope of the inventions embraced by the specification and drawings are defined by the words of the accompanying claims.

DETAILED DESCRIPTION OF THE INVENTION

Figure 1:
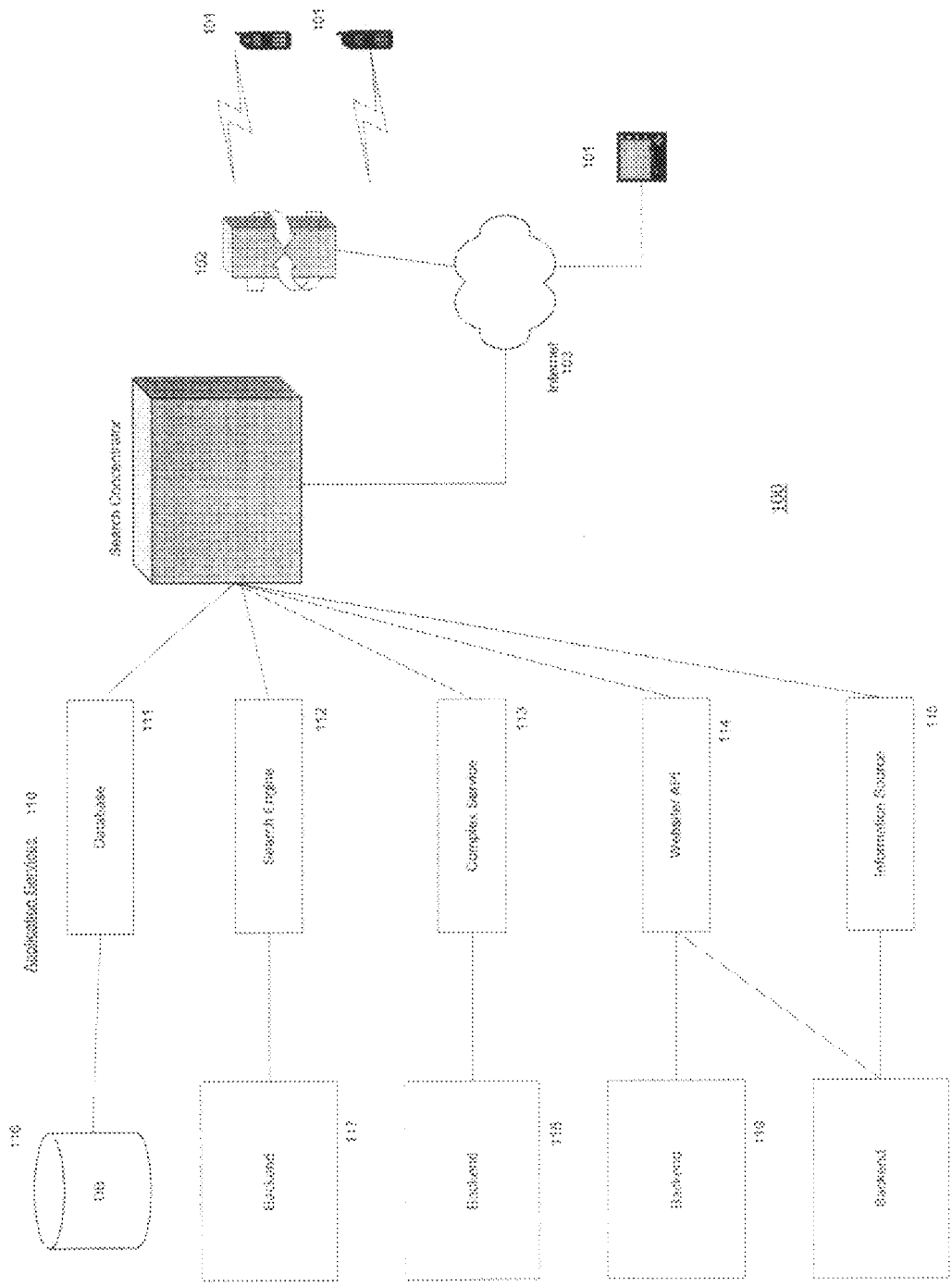
FIG. 1 is a high level block diagram of a system in accordance with an exemplary embodiment of the present inventions.

Various embodiments of the invention are described hereinafter with reference to the figures. It should be noted that the figures are not drawn to scale and elements of similar structures or functions are represented by like reference numerals throughout the figures. It should also be noted that the figures are only intended to facilitate the description of specific embodiments of the invention. The embodiments are not intended as an exhaustive description of the invention or as a limitation on the scope of the invention. In addition, an aspect described in conjunction with a particular embodiment of the invention is not necessarily limited to that embodiment and can be practiced in any other embodiment of the invention.

Turning now to the drawings, FIG. 1 is block diagram of a system 100 for searching backend datastores and data sources (116-120) via their application services (110-115) from a remote device 101(*a* . . . n) and delivering the results to the remote device 101(*a* . . . n). The purpose of the search is to create new data elements on the remote device. These data elements may then be synchronized with the user's office computer as described in U.S. patent application Ser. No. 09/921,228, which is hereby incorporated by reference in its entirety for all purposes as if full set forth herein. The number of remote devices 101 (a . . . n) depicted is not intended to be a limitation. The remote device may be any number of devices including but not limited to a user on terminal, a mobile device, PDA, or smart phone. Remote devices 101 (a . . . n) may be wireless devices which communicate via a wireless provider such as radio data provider 102, or the remote device 101 (a . . . n) may be connected to a intranet or the Internet through a hard connection. The remote device 101 (a . . . n) communicates with a search concentrator 104 (the search concentrator may also be referred to as a search server, and is an aspect of the global server as described in U.S. patent application Ser. No. 09/921,228) through an intranet or the Internet 103. The communication between the remote device 101 (a . . . n) and the search concentrator 104 is performed through the use of a uniform search protocol. The protocol allows the remote device 101 (a . . . n) to identify available application services (110-115) and to actually perform a search of some or all of the application services without knowing anything about the APIs or protocols actually utilized by the specific application service (110-115). Available application services may include a database 111 with storage 116, a search engine 112 with backend engine 117, a complex application services 113 with possible backend resource 118, a website with a program API 114 and backend 119, and other information sources 115 which gather data from the Internet or other sources 120.

In operation, the remote device 101 (a . . . n) queries the what application services (110-115) are available, or optionally maintains a list of available application services. The search concentrator 104 replies to the remote device 101 (a . . . n) with a list of available services and the data types they can use as keys or results. Each application service (110-115) can accept certain datatypes in queries, such as text, dates, times, stock symbols, part numbers, contact records, or the identifiers of objects it has previously returned. Likewise, each application service (110-115) returns results that contain certain datatypes. An application on the remote device 101 (a . . . n) usually can use one type of result. For example, if the application is requesting a geographic map, the query should specify only services that return objects that are maps. The remote device 101 (a . . . n) then sends a search query and a list of services that should be queried.

The search concentrator 104 transmits the search queries to the application services (110-115), translating the query if needed to the native interface formats of each application service (110-115) so that the application service can understand the request. The search concentrator receives results from the application services (110-115), and generates a search result summary. The search concentrator 104 is capable of identifying the characteristics of the remote device 101 (a . . . n) and it formats the search result summary appropriately for the specific remote device 101 (a . . . n). The search result summary may be transmitted all at once or in several pieces in accordance with the capabilities of the remote device 101 (a . . . n). The search concentrator 104 may be capable of indexing the search result summary information, thereby allowing the remote terminal 101 (a . . . n) to subsequently request all or part of any item returned in the search result summary. The selected item may be retrieved in its original form or in a form transcoded appropriately for transmission over the wireless 102 or wired link and rendering on the remote device 101 (a . . . n).

In addition, the remote device 101 (a . . . n) may designate any search result as a subscription, sometimes known as a standing search. A subscription is a promise by the search concentrator 104 that it will return an updated version of a particular search result at a later time. The search concentrator 104 is capable of keeping a description of the subscription, and can either periodically request that item again from an application service, or arrange for the application service to notify the search concentrator 104 when the data item changes. The search concentrator transmits any new results to the remote device 101 (a . . . n) using the same protocols as it did for the original results. Alternatively, the remote device 101 (a . . . n) can specify that the entire search be automatically run again at a later time, and the results reported back to it.

Figure 2:
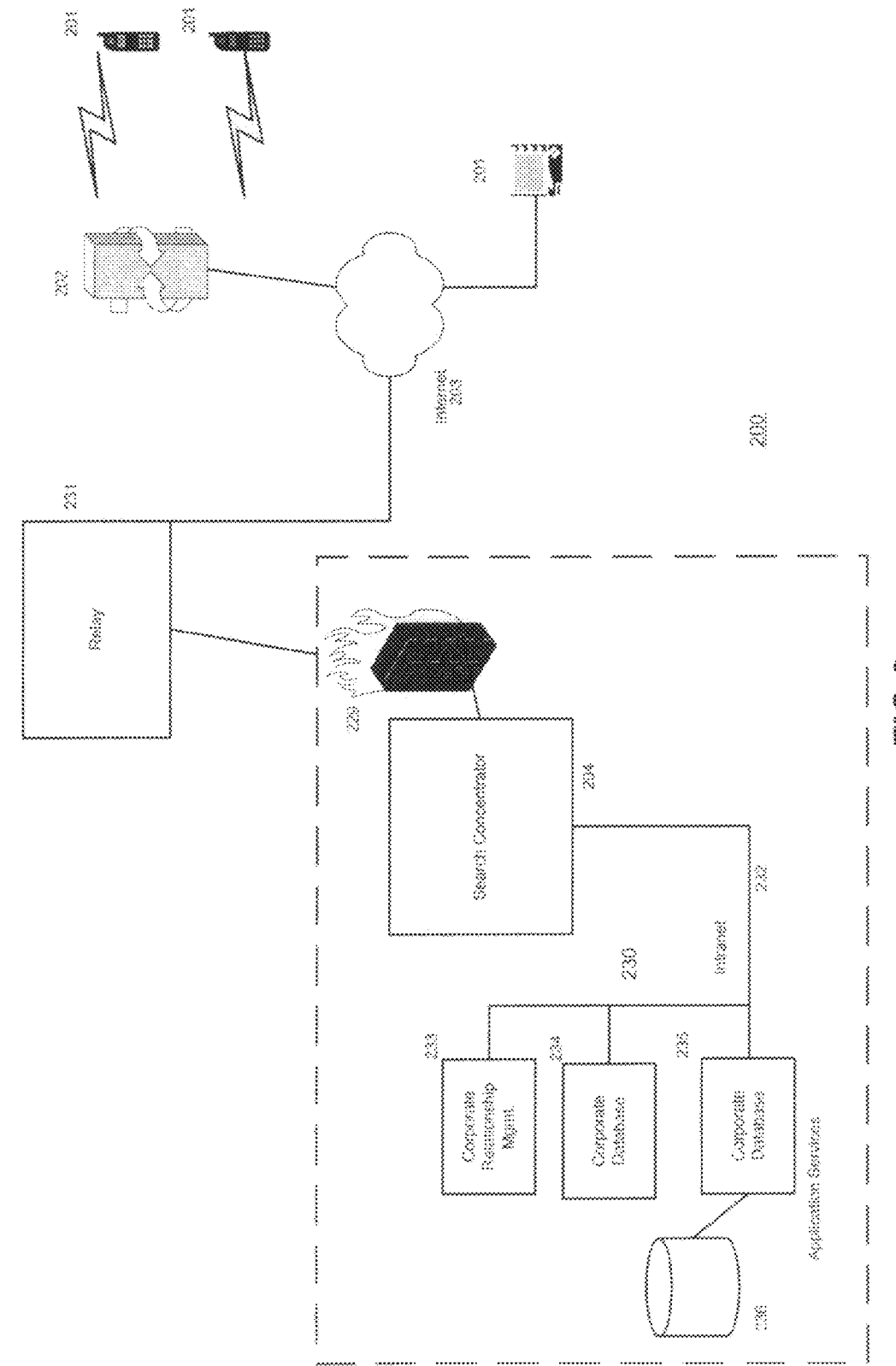
FIG. 2 is a block diagram of the system in accordance with FIG. 1 in an enterprise network configuration.

FIG. 2 is a block diagram of an alternate system 200 for searching application services 233-235 behind a firewall 229 from a remote device 201 (a . . . n) and delivering the results to the remote device 201 (a . . . n). The alternate system 200 may be a standalone system or may be a subsystem of system 100. The alternate system 200 has application services 233-235 located inside an organization 230 behind the firewall 229. The organization's firewall may not allow connections to be initiated from outside, so the server inside the firewall can initiate sessions with an outside server as is more fully described in U.S. patent application Ser. No. 09/921,228. A relay server 231 is a trusted machine outside the firewall 229 that receives requests from remote device 201 (a . . . n) and transmits them to a search concentrator 204, which processes them and transmits them to the application services 233-235. The search concentrator 204 can be a process running on a server such as the Visto™ Enterprise Server (VES), and the relay server 231 may be part of the Visto™ Network Operations Center (NOC). The application services 233-235 may include a corporate global address list (GAL) 233, a customer relationship management system (CRM) 234, corporate database 235 with storage 236, or any of the other services listed above. This list is not intended to be exhaustive and the application services may be any type known to those of skill in the art. The search concentrator 204 relays the query and returns the results in the same manner described in conjunction with FIG. 1. If the search concentrator 204 were placed outside the corporate firewall 229, that firewall would have to be opened to allow it to reach internal application services 233-235. Using a trusted relay 231 means that both ends are trusted, the traffic can be encrypted, and the number of kinds of requests allowed through the firewall 229 can remain low.

Figure 3:
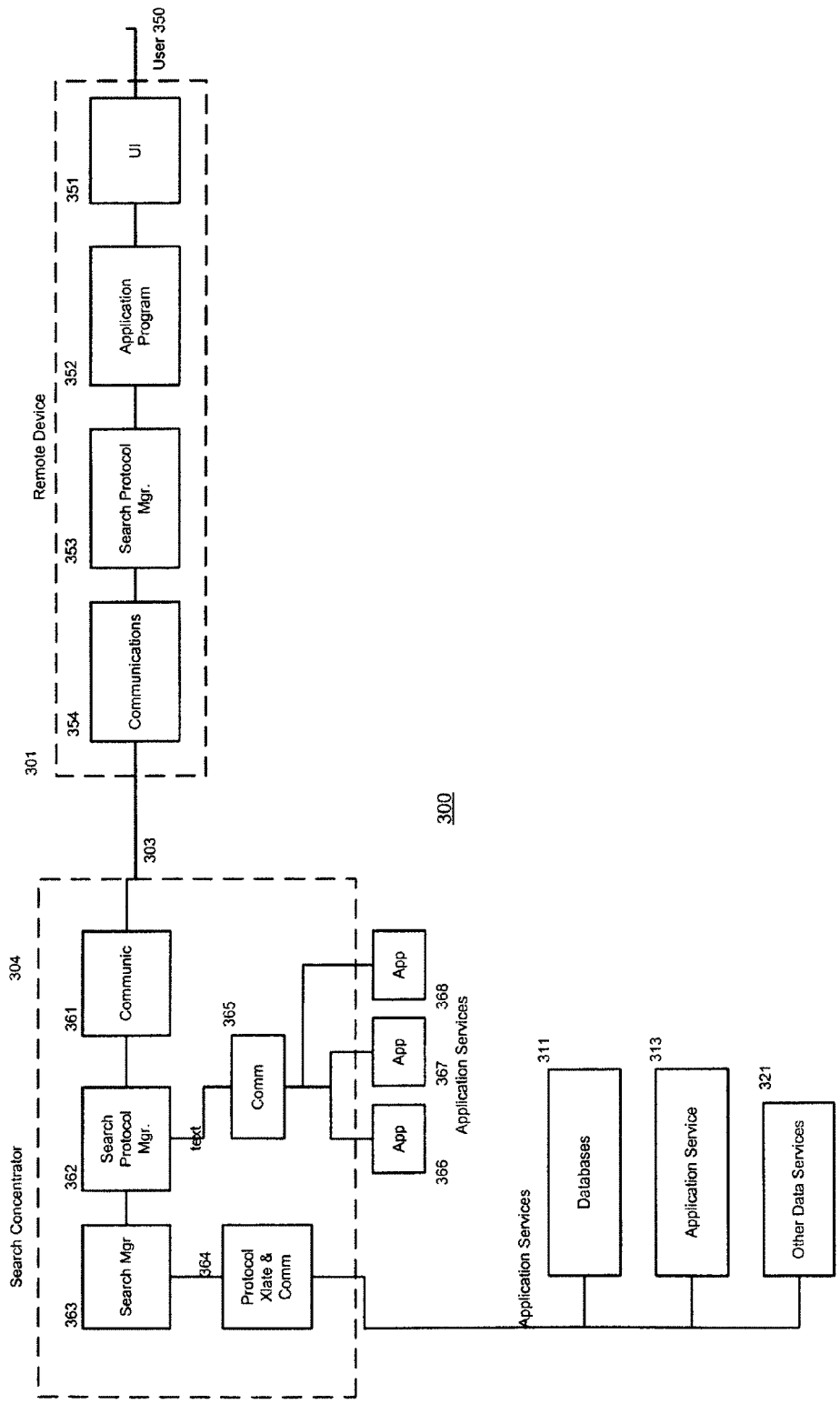
FIG. 3 is a high level block diagram of system components of the exemplary system of FIG. 1.

FIG. 3 is a block diagram of the software components of a system 300. In the system 300, a user 350 communicates with a remote device 301 via a user interface 351. An application program 352 executing on the remote device 301 communicates with a device search protocol manager 353 on the remote device to translate a search query 350 into a query in the uniform protocol. The search query is then transmitted over a communications channel 303 which may be a wireless or wired connection. Communication modules 354, 361 on either end of the communications channel 303 transport the query to the search concentrator 304. Application program 352 may be a simple user interface that allows the user to type or build a query, or it may be completely different program, such as a calendar, that issues a query as a side effect of its main task.

A search protocol manager on the search concentrator 362 decodes and encodes the search query and search results. A search manager 363 tracks the applications services (311, 313, 321, 366-368), and their availability. It stores all search results and formats each one for sending back to the remote device. When application services 366, 367, and 368 understand the uniform protocol, the search query can be forwarded to the application services 366, 367, 368 by a communications module 365. Application services that require translation 311, 313, and 321 are handled by the protocol translation module 364. In some cases this translation maybe identical to that done by the global server as disclosed in U.S. patent application Ser. No. 09/921,228. In one embodiment, the search concentrator 304 is a part of the global server described in U.S. patent application Ser. No. 09/921,228 and shares modules, such as communications 361, 365 with the data synchronization aspect of the global server.

Any processes descriptions or blocks in flow charts should be understood as representing modules, segments, portions of code which include one or more executable instructions for implementing specific logical functions or steps in the process, and alternate implementations are included within the scope of the exemplary embodiment of the present invention in which functions may be executed out of order from that shown or discussed, including substantially concurrently or in reverse order, depending upon the functionality involved, as would be understood by those skilled in the art.

Figure 4:
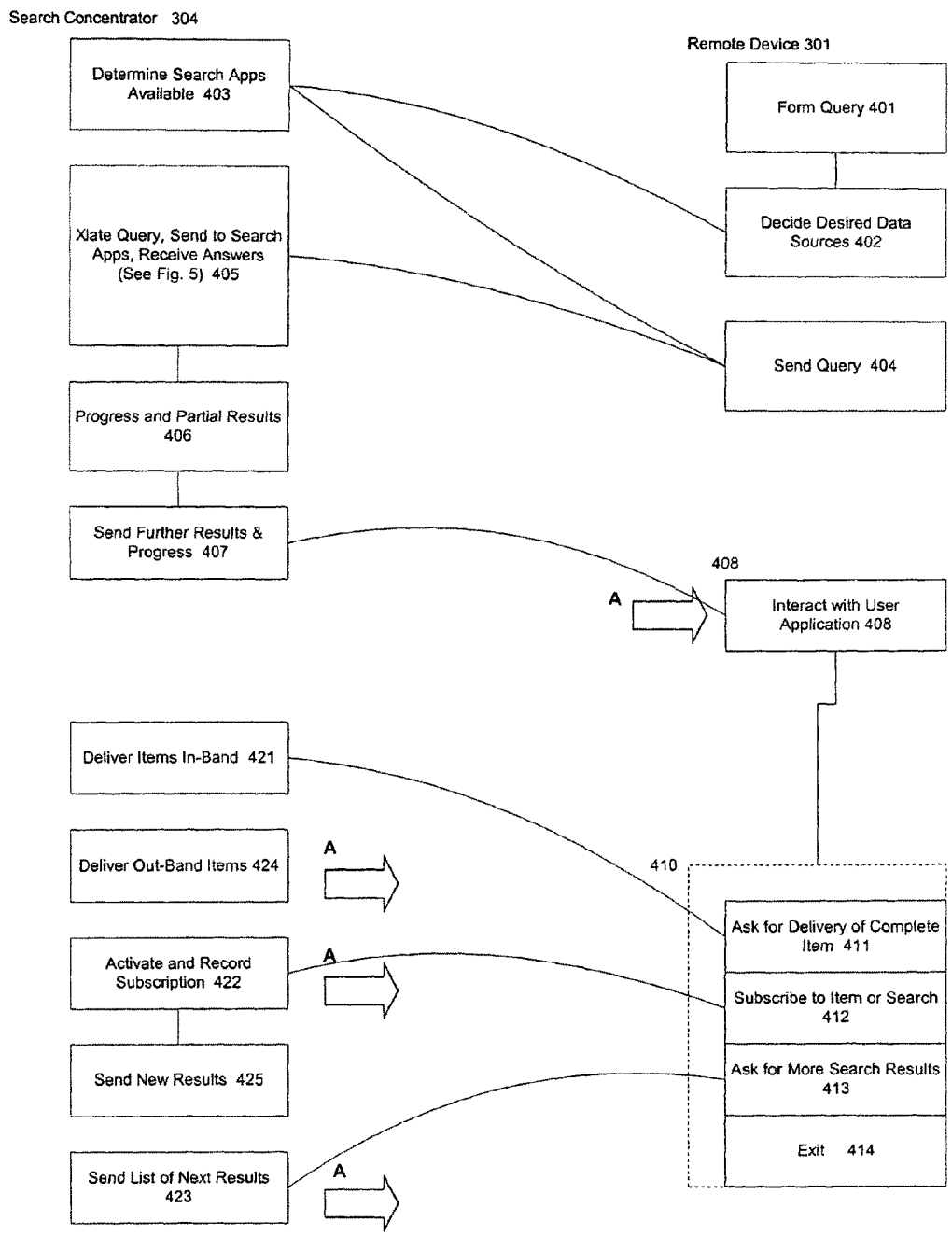
FIG. 4 is a flowchart of an exemplary query process of a remote terminal of FIG. 1.

FIG. 4 is a flow chart illustrating the method used by the search concentrator 304 to search disparate application services 311, 313, 321, 366-368. It describes the interaction between a remote device 301 and a search concentrator 304. Events or actions which occur on the search concentrator 304 are shown on the left side of FIG. 4, and events or actions that occur on the remote device 301 are on the right. A user of or an application on the remote device 301 forms a query in 401 that is a uniform protocol, such as that previously described. In the uniform protocol, a query is not restricted to text. The query can contain a list of result datatypes that the query is requiring. Complex test expressions of can be specified in the query, and a result must satisfy the expression in order to be included as a valid result. Test expressions may contain arithmetic comparisons, text matching tests such as 'begins with "Doc"', wildcards, and logical combinations of 'and' and 'or'. The uniform search protocol allows for the combination of asking for specific datatypes, requiring results to pass complex tests, and searching over a large array of application services, with varying interfaces and APIs that need not be known or interpreted by the requesting application. Then an application on the remote device 301 can specify a data source to search 402, for example, a company's Global Address List. The application on the remote device 301 can also request a list of sources 402 that returns a specified data type, such as weather reports, or the application can request all sources 402. Once the search source request is composed, the search request is sent to the search concentrator 304. The search concentrator 304 determines which of the requested sources can return the requested data 403, and transmits the information to the remote device 301.

Figure 5:
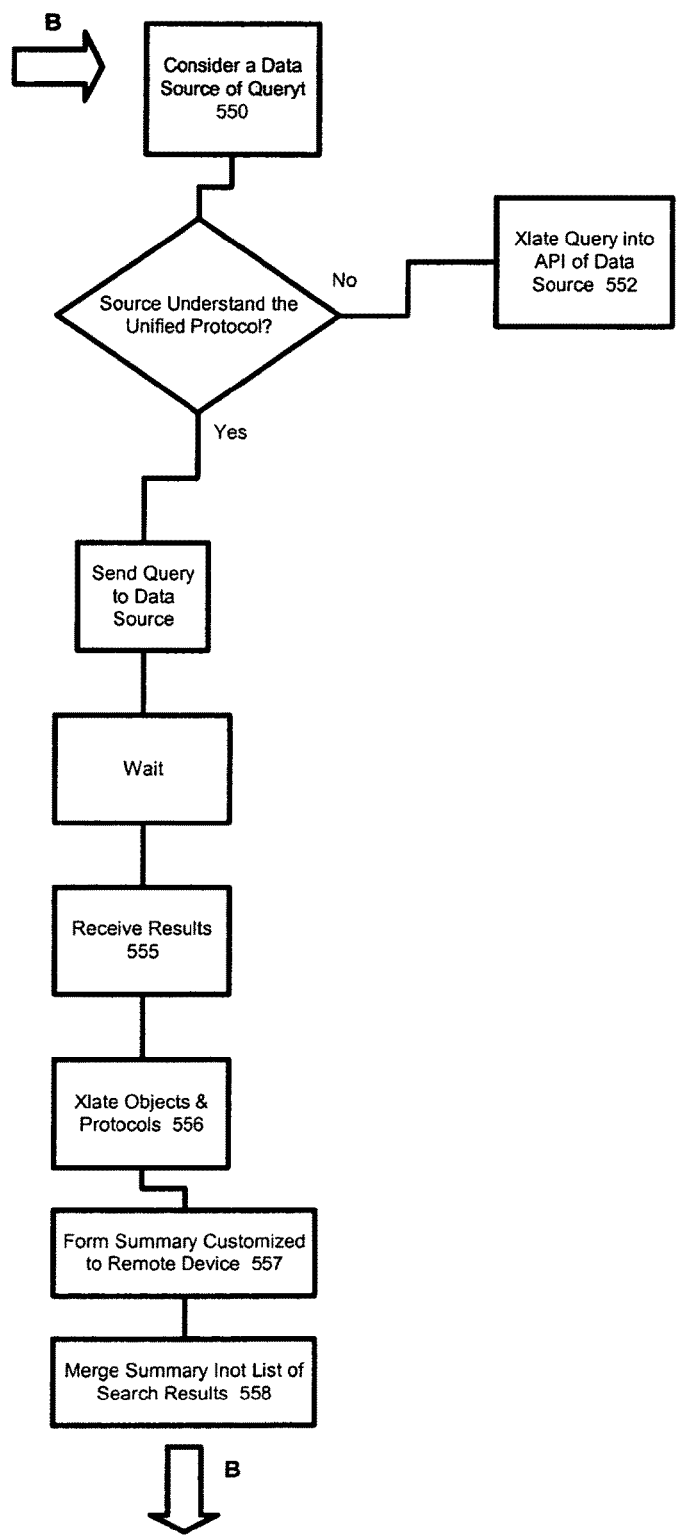
FIG. 5 is a flowchart of a query translation in accordance with an exemplary aspect of the inventions.

The remote device 301 then sends a full query 404, including the selection of data sources to search. The search concentrator 304 transmits the search requests to the various application services 405, translating the request into formats understood by each application service 311, 313, 321, 366-368. (FIG. 5. depicts the method of translation.) The search concentrator 304 is capable of translating into a variety of formats, for example an SQL query, the Google search API for programs, webDav to a Microsoft Exchange server, the interface of SalesForce.com.

The search concentrator may report the results as they are received, along with estimates of the percent completion of the searches 406. The search concentrator composes and sends further results and progress estimates as they become available 407. Each data source may provide many results, these results are merged into a master list for the current query by the search concentrator 304. The list has a text description of each result, and optionally a handle to a complex data object, for example, a map, a contact record, or a 3D picture of an automobile part.

The remote device 301 receives results 408 and transmits the results to the application program 352 that requested the query on the remote device 301. The application program 352 maybe a simple pass through to user interface 351. The application program 352 can take further action on any of the summarized search results. Steps 406, 407 and 408 may be partially asynchronous. The application program 352, directed by the user, has choices 410. One option is to ask for the complete document or file 411 that was identified in a search result. The remote device 301 the sends a request to the search concentrator 304, which formats the document 421. If the full document is text or a small object, it may be delivered inside of a message in the unified search protocol 421. This is called delivery in-band. If the document is large, or is a complex data object, it may be sent to the remote device 301 using another protocol 424 such as FTP or HTTP. This is called out-of-band delivery. When a data object arrives, it is submitted to an appropriate application program on the remote device 301. That program allows the user to see and manipulate the object. For example a map object may be displayed by a navigation program, that allows the user to scroll and scale the map and see popups with details about points of interest; a 3D object is shown in an application that lets the user rotate it; a section of a contacts database can be sorted and displayed in a variety of ways.

Alternatively the user or application can turn a search result into a subscription 412. The user can request to receive the result of the same search again periodically. For example, if the search was for the quantity of a certain part in a company's inventory, the user can ask that the current number in inventory be reported to the remote device 301 every morning at 7 am. The subscription can be specified such that the results are returned based on a variety of factors, for example, the results could be returned when there is a change in value of a result, or when the value changes to a particular specified value. In another example, the query may be for the weather in San Francisco, the subscription could request an update every time "rain" appears in that weather report; or, the user can subscribe to a prediction that the nighttime temperature will fall below freezing at a particular location. A subscription can also be for a report every time a number changes in value, such as a specific projection in a sales forecast. A subscription may be a continued search. As new results are reported by an application service, new results are sent to the remote device. The new results may be pushed, and arrive unsolicited at the remote device. An example of this is to search for traffic accidents in a particular territory. A subscription may also be a search description that is remembered on the search concentrator 304 and can be rerun upon request. These examples are not intended to be exhaustive of the type of queries that may be formed. A subscription can be formed for a result that is textual, a document, or an object of any datatype. It should be noted that once the user 350 (or an application 352) has a result, the process of turning it into a subscription is simplified. Since the conditions for the initial search are already specified, a simple indication of how often to execute the same search, or what value to be alerted on, or to be alerted when the value changes is sufficient to convert that search to a subscription. The search concentrator 304 records 422 the subscription, and constructs the alerts needed to implement the subscription. The search concentrator reruns all or a portion of the original query, as required by the request, at periodic times. If the data source is capable of alerting the search concentrator 304 when a data value changes, the search concentrator 304 creates and sends an application service (for example 313) a request to be notified when that value changes. When the data value changes in the application service, it will notify the search concentrator 304, which formats the result and sends it 425 to the remote device 301.

The search concentrator is unifying a large number of diverse formats and methods for the searches and the subscriptions. The software on the remote device 301 is only required to recognize the uniform search protocol, and thus is shielded from the highly varied requirements of the many data sources.

The uniform search protocol includes a way for new data sources to be registered with the search concentrator 304, so that they can be searched. A person with a new application service 311, 313, 321, 366-368 can write a connector module that tells the search concentrator 304 what queries it can handle, and what type of data objects it returns. Alternatively, the connector module can communicate with the search concentrator 304 in the uniform search protocol, and communicate with its data source (116-120) in the native format of the data source. The connector module may be compatible with the Visto™ Business Freedom system. Because of the generality of the uniform search protocol, many diverse kinds of information sources, such as a library of structured 10-K reports of corporations, can be registered with the search concentrator 304, providing the remote device 301 with an unprecedented ability to search and subscribe to data objects and non-textual information.

Typically the remote device receives a limited amount of text at one time. If the user needs to see more results, a request can be made for additional search results 413. The search concentrator 304 constructs the next batch of results and transmits them 423 to the remote device 301.

When the search is complete the application 352 or the user is satisfied, the application can exit action 410. The application 352 can also request the search concentrator 304 to abort the search at any time after issuing the original query 404.

Visto™ Corporations Visto Mobile Terminal Client 5.5 is an example of software that implements the steps performed on the remote device.

FIG. 5 is a flow chart illustrating the details of the translation of FIG. 4. The translation 405 begins by analyzing each application service (i.e. 311) specified in the query 550. The search concentrator 304 contains or has access to a database that records the properties of each application service. The search concentrator 304 then determines if the application service understands the uniform search protocol. If the application service does not understand the uniform protocol, the search concentrator 304 translates the query into the API of the data source 552. This may be done in a connector module, that may reside on another machine and may be supplied by a third party, or it may be in the protocol translator 364. The query is then sent to the application service.

The same process is performed for each application service (some of 311, 313, 321, 366-368) specified in the query, therefore the search concentrator 304 may repeat this process while waiting for a reply from an application service. The application service returns results 555 and the search concentrator 304 then translates the results into the uniform search format 556, and optionally converts any objects to a different format. Documents or objects may arrive in a format that is unusual or unknown to the remote device 301. The search concentrator 304 may have a list of standard translations to make on such documents or objects. The results are then compiled in the form of text summaries of the proper length and customized for the software utilized by the remote device 301 and the requesting application 557. The text summaries and object handles for the documents from each data source are then merged into the list of search results 558 and the translation is complete.

Obviously, readily discernible modifications and variations of the present invention are possible in light of the above teachings. It is therefore to be understood that within the scope of the appended claims, the invention may be practiced otherwise than as specifically described herein. For example, while described in terms of both software and hardware components interactively cooperating, it is contemplated that the system described herein may be practiced entirely in software. The software may be embodied in a carrier such as magnetic or optical disk, or a radio frequency or audio frequency carrier wave.

As noted previously the forgoing descriptions of the specific embodiments are presented for purposes of illustration and description. They are not intended to be exhaustive or to limit the invention to the precise forms disclosed and obviously many modifications and variations are possible in view of the above teachings. The embodiments were chosen and described in order to explain the principles of the invention and its practical applications, to thereby enable those skilled in the art to best utilize the invention and various embodiments thereof as suited to the particular use contemplated. It is intended that the scope of the invention be defined by the following claims and their equivalents.

The invention claimed is:

1. A method of receiving search results from a search server at a mobile device, the method comprising:
    transmitting, from the mobile device, an initial query to a search server, the initial query comprising a request for a list of data sources configured to return a search result of a specified data type;
    receiving, at the mobile device from the search server, an initial query result comprising a list of one or more data sources configured to return a search result of the specified data type;
    transmitting, at the mobile device, a full query to the search server, the full query comprising a search query and a selection of at least one of the one or more data sources configured to return a search result of the specified data type;
    receiving, at the mobile device from the search server, a full query result identifying one or more search results;
    responsive to a user selection of a first search result of the one or more search results at the mobile device, transmitting, from the mobile device, a request to the search server for a first data object associated with the first search result;
    receiving, at the mobile device, the first data object of the specified data type;
    identifying, at the mobile device, based on the specified data type of the first data object, a particular application program of a plurality of available application programs configured to process the first data object; and
    passing the first data object to the identified application program on the mobile device in order to enable a user to access the first data object.

2. The method of claim 1, wherein the first data object comprises a complex data object.

3. The method of claim 2, wherein the complex data object comprises at least one of a map, a 3D object, or a contact record.

4. The method of claim 1, the method further comprising:
    responsive to a user selection of a second search result, receiving, at the mobile device from the search server, via a first protocol, a second data object associated with the second search result at the mobile device, the second data object being of a different type to the first data object,
    wherein the first data object is received at the mobile device via a second protocol, different from the first protocol.

5. The method of claim 1, wherein the identified application program enables the user to perform an action in relation to the first data object on the mobile device.

6. The method of claim 5, wherein the action comprises manipulation of the first data object.

7. The method of claim 1, further comprising: formulating the initial query using one of the plurality of available application programs on the mobile device.

8. A non-transitory, computer-readable medium comprising computer-executable instructions that, when executed by a processor in a computing device, cause the computing device to perform a method of receiving search results from a search server, the method comprising:
    transmitting an initial query to a search server, the initial query comprising a request for a list of data sources configured to return a search result of a specified data type;
    receiving from the search server an initial query result comprising a list of one or more data sources configured to return a search result of the specified data type;

transmitting a full query to the search server, the full query comprising a search query and a selection of at least one of the one or more data sources configured to return a search result of the specified data type;

receiving from the search server a full query result dot-identifying one or more search results;

responsive to a user selection of a first search result of the one or more received search results, transmitting a request to the search server for a first data object associated with the first search result;

receiving the first data object of the specified data type at the mobile device;

identifying, based on the specified data type of the first data object, a particular application program of a plurality of available application programs configured to process the first data object; and passing the first data object to the identified application program in order to enable a user to access the first data object.

9. The non-transitory, computer-readable medium of claim 8, wherein the first data object comprises a complex data object.

10. The non-transitory, computer-readable medium of claim 8, wherein the method further comprises:

responsive to a user selection of a second search result, receiving from the search server, via a first protocol, a second data object associated with the second search result at the mobile device, the second data object being of a different type to the first data object, wherein the first data object is received at the mobile device via a second protocol, different from the first protocol.

11. The non-transitory, computer-readable medium of claim 9, wherein the complex data object comprises at least one of a map, a 3D object, or a contact record.

12. The non-transitory, computer-readable medium of claim 8, wherein the identified application program enables the user to perform an action in relation to the first data object.

13. The non-transitory, computer-readable medium of claim 12, wherein the action comprises manipulation of the first data object.

14. The non-transitory, computer-readable medium of claim 8, wherein the method further comprises: formulating the initial query using one of the plurality of available application programs.

15. A mobile device for use in providing a user with access to data, the mobile device having a plurality of application programs for use in providing the user with access to different types of data objects, the mobile device being configured to:

transmit an initial query to a search server, the initial query comprising a request for a list of data sources configured to return a search result of a specified data type;

receive from the search server an initial query result comprising a list of one or more data sources configured to return a search result of the specified data type;

transmit a full query to the search server, the full query comprising a search query and a selection of at least one of the one or more data sources configured to return a search result of the specified data type;

receive from the search server a full query result identifying one or more search results;

responsive to a user selection of a first search result of the one or more search results, transmit a request to the search server for a first data object associated with the first search result;

receive the first data object of the specified data type at the mobile device;

identify, based on the specified data type of the first data object, a particular application program of a plurality of available application programs configured to process the first data object; and pass the first data object to the identified application program in order to enable a user to access the first data object.

16. The mobile device of claim 15, wherein the first data object comprises a complex data object.

17. The mobile device of claim 16, wherein the complex data object comprises at least one of a map, a 3D object, or a contact record.

18. The mobile device of claim 15, wherein the mobile device is further configured to:

responsive to a user selection of a second search result, receiving from the search server, via a first protocol, a second data object associated with the second search result at the mobile device, the second data object being of a different type to the first data object, wherein the first data object is received at the mobile device via a second protocol, different from the first protocol.

19. The mobile device of claim 15, wherein the identified application program enables the user to perform an action in relation to the first data object.

20. The mobile device of claim 19, wherein the action comprises manipulation of the first data object.

* * * * *

UNITED STATES PATENT AND TRADEMARK OFFICE
CERTIFICATE OF CORRECTION

PATENT NO. : 9,489,422 B2  
APPLICATION NO. : 12/294708  
DATED : November 8, 2016  
INVENTOR(S) : Sean Michael Quinlan et al.

Page 1 of 1

It is certified that error appears in the above-identified patent and that said Letters Patent is hereby corrected as shown below:

In the Claims

Column 9, Line 5, In Claim 8, delete "result dot-" and insert -- result --, therefor.

Signed and Sealed this
Seventh Day of March, 2017

Michelle K. Lee
*Director of the United States Patent and Trademark Office*